United States Patent
Hashiguchi

(10) Patent No.: US 7,840,794 B2
(45) Date of Patent: Nov. 23, 2010

(54) OS STARTING METHOD AND APPARATUS USING THE SAME

(75) Inventor: Masahiro Hashiguchi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 1119 days.

(21) Appl. No.: 11/513,037

(22) Filed: Aug. 31, 2006

(65) Prior Publication Data
US 2007/0061561 A1 Mar. 15, 2007

(30) Foreign Application Priority Data
Sep. 1, 2005 (JP) ............ P. 2005-252954

(51) Int. Cl.
G06F 9/00 (2006.01)
G06F 15/177 (2006.01)

(52) U.S. Cl. .................. 713/2; 713/1; 713/100; 713/150; 713/182; 713/183

(58) Field of Classification Search .......... 713/1, 713/2, 100, 150, 182, 183
See application file for complete search history.

(56) References Cited

U.S. PATENT DOCUMENTS
2003/0212911 A1* 11/2003 Challener et al. .......... 713/202

FOREIGN PATENT DOCUMENTS
| CN | 2266149 Y | 10/1997 |
| CN | 1186732 C | 1/2005 |
| JP | 2002-14740 A | 1/2002 |
| JP | 2002-222022 A | 8/2002 |
| JP | 2003-99147 A | 4/2003 |
| JP | 2005-70968 A | 3/2005 |

* cited by examiner

Primary Examiner—Thomas Lee
Assistant Examiner—Fahmida Rahman
(74) Attorney, Agent, or Firm—Sughrue Mion, PLLC

(57) ABSTRACT

An OS starting method of an OS stored in a hard disk of an information processing apparatus includes: starting a BIOS stored in a storage when it is determined that a power is turned on; searching for a boot device that can be started; starting a boot OS stored in an external storage medium; displaying a password input screen on a display section; generating an unlock password for the hard disk by concatenating information unique to the external storage medium with an input password and converting the information being concatenated with the input password to a hash value; unlocking a locked state of the hard disk with the unlock password when it is determined that a setting of security of the hard disk is performed; starting a MBR of the hard disk whose locked state is unlocked; starting a boot loader of the OS; and starting the OS.

12 Claims, 6 Drawing Sheets

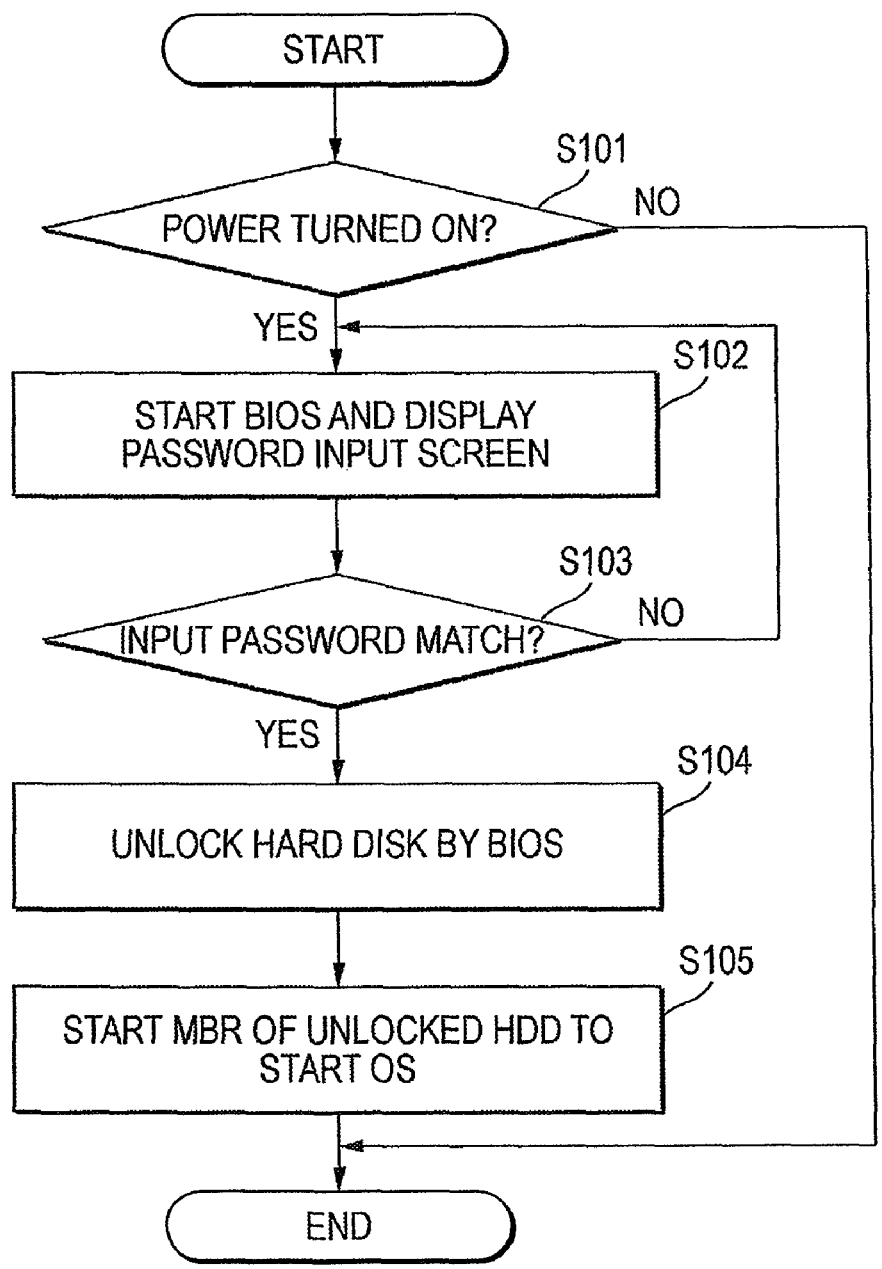

OS STARTING METHOD AND APPARATUS USING THE SAME

This application claims foreign priority based on Japanese Patent application No. 2005-252954, filed Sep. 1, 2005, the content of which is incorporated herein by reference in its entirety.

BACKGROUND OF THE INVENTION

1. Field of the Invention

The present invention relates to a method of starting an OS (Operating System; hereinafter referred to as OS) stored in a hard disk on an information processing apparatus such as a personal computer, and an apparatus using the same, and in particular to an OS starting method capable of starting an OS based on authentication by a program in an external storage medium and protecting information (OS and other information) stored in a hard disk, and apparatus using the same.

2. Description of the Related Art

Related art references regarding an OS starting method and an apparatus using the same include: JP-A-2002-014740, JP-A-2002-222022, JP-A-2003-099147 and JP-A-2005-070968.

FIG. 4 is a block diagram showing an example of apparatus that uses the related art OS starting method. In FIG. 4, a numeral 1 represents input section for inputting information into the apparatus such as a keyboard, an operation button and a touch panel, a numeral 2 represents control section such as a CPU (Central Processing Unit) and an MPU (Micro Processing Unit), a numeral 3 represents display section such as a CRT (Cathode Ray Tube) and an LCD (Liquid Crystal Display), a numeral 4 represents storage section such as a flash memory into which BIOS (Basic Input Output System) is stored, and a numeral 5 represents storage section such as a hard disk into which an OS and various information is stored. The numerals 1, 2, 3, 4 and 5 constitute a computer 50.

Output of the input section 1 is connected to the control section 2. A display signal from the control section 2 is connected to the display section 3. The storage section 4 and the storage section 5 are respectively interconnected with the control section 2.

Operation in the related art example shown in FIG. 4 is described by referring to FIGS. 5 and 6. FIG. 5 is a flowchart explaining the operation of the control section 2. FIG. 6 is an explanatory drawing explaining the details of an OS stored in the storage section 5.

As an initial state the BIOS is stored in the storage section 4 (flash memory) as shown by "BI01" in FIG. 4. As shown by "OS01" in FIG. 4, the OS is stored in the storage section 5 (hard disk).

In "S001" in FIG. 5, the control section 2 determines whether power is turned on. When it has determined that power is turned on, the control section 2 starts the BIOS stored in the storage section 4 (to be more specific, loads and executes the BIOS; hereinafter simply referred to as "starts the BIOS") in "S002" in FIG. 5, and conducts an initial test when the power is turned on and searches for a boot device that can be started.

In "S003" in FIG. 5, the control section 2 starts the MBR (Master Boot Record) that is a first sector of the first found boot device (to be more specific, loads and executes the program stored in the MBR; hereinafter referred to as "starts the MBR"), starts the boot loader of the OS (to be more specific, loads and execute the boot loader; hereinafter simply referred to as "starts the boot loader"), and starts the OS (to be more specific, loads and executes the OS; hereinafter simply referred to as "starts the OS").

In the hard disk (as the storage section 5) shown by "HD11" in FIG. 6, the MBR indicated by "MB11" in FIG. 6 and the OS indicated by "OS11" are stored. The control section 2 starts the MBR, the boot loader of the OS, and the OS.

As a result, when power is turned on, the control section 2 starts the BIOS and searches for a boot device that can be started. The MBR at a first sector of the found boot device is started, the boot loader of the OS is started, and the OS is started. This makes it possible to start the OS stored in the storage section 5 (hard disk) of the computer 50 that is an information processing apparatus.

In the related art example shown in FIG. 4, when authentication is made for security assurance before the OS is started, some sort of action should be taken with regards to the storage section 5 (hard disk) where the BIOS or the OS is stored.

For example, by adding a function to the program stored in the MBR of the boot device in the hard disk so that the starting of the OS is inhibited until authentication before booting is successful, authentication before starting the OS is made possible. However, when the hard disk is recognized as a slave hard disk of another computer, there exists a problem that the information in the hard disk can be easily analyzed.

For example, the entire hard disk may be encrypted to supplement the addition of authentication to the MBR in order to ensure security. To implement this function, it is necessary to develop a hard disk driver for each OS, and dependence on the OS and hardware leads to lower performance or failure to encrypt the entire hard disk.

Furthermore, for example, it is possible to add to the BIOS an authentication function for before starting the OS as well as locking the hard disk itself with ATA (AT Attachment) security command of IDE (Integrated Drive Electronics), thereby providing security.

FIG. 7 is a flowchart explaining the operation of the control section 2 during initialization authentication by the BIOS. As an initial state, it is assumed that the hard disk is set to the locked state by the ATA security command.

In "S101" in FIG. 7, the control section 2 determines whether power is turned on. When it has determined that power is turned on, the control section 2 starts the BIOS stored in the storage section 4 and makes the display section 3 display a password input screen.

In "S103" in FIG. 7, the control section 2 determines whether the password input from the input section 1 matches a preset password. When the control section 2 has determined that the passwords do not match, execution returns to "S102" in FIG. 7.

When the control section 2 has determined that the passwords match in "S103" in FIG. 7, the control section 2 unlocks the locked state of the hard disk by using the ATA security command, in "S104" in FIG. 7. In "S005" in FIG. 7, the control section 2 starts the MBR of the unlocked hard disk, the boot loader of the OS, and the OS.

Thus, it is impossible to read the information in the hard disk until the entire hard disk is unlocked by the ATA security command during authentication during initialization of the OS. This provides security.

This approach is unavailable to a computer that mounts BIOS without an authentication function during initialization of the OS. To make this approach available, a process is required wherein the BIOS is re-written to include an authentication function during initialization of the OS, or the like.

The authentication is BIOS-based, so physical authentication using an external storage medium is unavailable. When a password has been leaked or a password is cracked, the information in the hard disk cannot be protected.

SUMMARY OF THE INVENTION

The present invention has been made in view of the above circumstances, and provides an OS starting method capable of starting an OS based on authentication by a program in an external storage medium as well as protecting information in a hard disk, and apparatus using the same.

In some implementations, an OS (Operating System) starting method of the invention of an OS that is stored in a hard disk of an information processing apparatus comprising:

starting a BIOS (Basic Input Output System) stored in a storage section when it is determined that a power is turned on;

searching for a boot device that can be started;

starting a boot OS being found and stored in an external storage medium;

displaying a password input screen on a display section;

generating an unlock password for the hard disk to be started by concatenating information unique to the external storage medium with an input password inputted by an input section and converting a concatenated result to a hash value;

determining whether a setting of security of the hard disk to be started is performed;

unlocking a locked state of the hard disk with the unlock password when it is determined that the setting of security of the hard disk to be started is performed;

starting a MBR (Master Boot Record) of the hard disk whose locked state is unlocked;

starting a boot loader of the OS; and starting the OS.

This makes it possible to authenticate when starting the OS without providing the BIOS with an authentication function. The hard disk is set to the locked state by the ATA security command so that protection of the information (OS and other information) stored in the hard disk is enabled. The unlock password used to unlock the hard disk is generated by concatenating an input password with a unique code such as a serial number of a USB registered to an external storage medium. Therefore, physical authentication by using an external storage medium is possible.

The OS starting method according to claim 1, further comprising:

The OS starting method of the invention further comprises: performing the setting of security of the hard disk when it is determined that the setting of security of the hard disk is not performed.

In the OS starting method of the invention, the unlock password is generated by concatenating with the input password the information unique to the external storage medium and information generated based on a user name that is previously registered, and converting a concatenated result to the hash value.

This makes it possible to authenticate when before starting the OS without providing the BIOS with an authentication function. The hard disk is set to the locked state by the ATA security command so that protection of the information (OS and other information) stored in the hard disk is enabled. The unlock password used to unlock the hard disk is generated by concatenating an input password with a unique code such as the serial number of a USB registered to an external storage medium. Therefore, physical authentication by using an external storage medium is possible.

The OS starting method of the invention further comprising:

controlling an available volume of the hard disk for each user being authenticated by the boot OS.

This makes it possible to authenticate when starting the OS without providing the BIOS with an authentication function. The hard disk is set to the locked state by the ATA security command so that protection of the information (OS and other information) stored in the hard disk is enabled. The unlock password used to unlock the hard disk is generated by concatenating an input password with a unique code such as the serial number of a USB registered to an external storage medium. Therefore, physical authentication by using an external storage medium is possible.

The OS starting method of the invention further comprising:

showing an available area of the hard disk in a volume unit, a directory unit or a file unit by decoding for each user being authenticated by the boot OS, and concealing other area of the hard disk by encryption.

This makes it possible to authenticate when starting the OS without providing the BIOS with an authentication function. The hard disk is set to the locked state by the ATA security command so that protection of the information (OS and other information) stored in the hard disk is enabled. The unlock password used to unlock the hard disk is generated by concatenating an input password with a unique code such as the serial number of a USB registered to an external storage medium. Therefore, physical authentication by using an external storage medium is possible.

In some implementations, an apparatus of the invention comprising:

an input section;

a display section;

a storage section in which a BIOS (Basic Input Output System) is stored;

a hard disk in which an OS (Operating System) is stored;

an external storage medium in which a boot OS is stored; and a control section, wherein the control section starts the BIOS when it is determined that a power is turned on, searches for a boot device that can be started, starts the boot OS being found, displays a password input screen on the display section, generates an unlock password for the hard disk by concatenating an information unique to the external storage medium with an input password inputted by the input section and converting a concatenated result to a hash value, determines whether a setting of security of the hard disk is performed, unlocks a locked state of the hard disk with the unlock password when it is determined that the setting of security of the hard disk is performed, starts a MBR (Master Boot Record) of the hard disk whose locked state is unlocked, starts a boot loader of the OS; and starts the OS.

This makes it possible to authenticate when starting the OS without providing the BIOS with an authentication function. The hard disk is set to the locked state by the ATA security command so that protection of the information (OS and other information) stored in the hard disk is enabled. The unlock password used to unlock the hard disk is generated by concatenating an input password with a unique code such as the serial number of a USB registered to an external storage medium. Therefore, physical authentication by using an external storage medium is possible.

In the apparatus of the invention, the control section performs the setting of security of the hard disk when it is determined that the setting of security of the hard disk is not performed.

In the apparatus of the invention, the control section generates the unlock password by concatenating with the input password the information unique to the external storage medium and information generated based on a user name that is previously registered, and converting a concatenated result to the hash value.

This makes it possible to authenticate when starting the OS without providing the BIOS with an authentication function. The hard disk is set to the locked state by the ATA security command so that protection of the information (OS and other information) stored in the hard disk is enabled. The unlock password used to unlock the hard disk is generated by concatenating an input password with a unique code such as the serial number of a USB registered to an external storage medium. Therefore physical authentication by using an external storage medium is possible.

In the apparatus of the invention, the control section controls an available volume of the hard disk for each user being authenticated by the boot OS.

This makes it possible to authenticate when starting the OS without providing the BIOS with an authentication function. The hard disk is set to the locked state by the ATA security command so that protection of the information (OS and other information) stored in the hard disk is enabled. The unlock password used to unlock the hard disk is generated by concatenating an input password with a unique code such as the serial number of a USB registered to an external storage medium. Therefore physical authentication by using an external storage medium is possible.

In the apparatus of the invention, the control section shows an available area of the hard disk in a volume unit, a directory unit or a file unit by decoding for each user being authenticated by the boot OS, and conceals other area of the hard disk by encryption.

This makes it possible to authenticate when starting the OS without providing the BIOS with an authentication function. The hard disk is set to the locked state by the ATA security command so that protection of the information (OS and other information) stored in the hard disk is enabled. The unlock password used to unlock the hard disk is generated by concatenating an input password with a unique code such as the serial number of a USB registered to an external storage medium. Therefore physical authentication by using an external storage medium is possible.

BRIEF DESCRIPTION OF THE DRAWINGS

FIG. 7 is a flowchart explaining the operation of the control section when initializing authentication by the BIOS.

DESCRIPTION OF THE PREFERRED EMBODIMENTS

Figure 1:
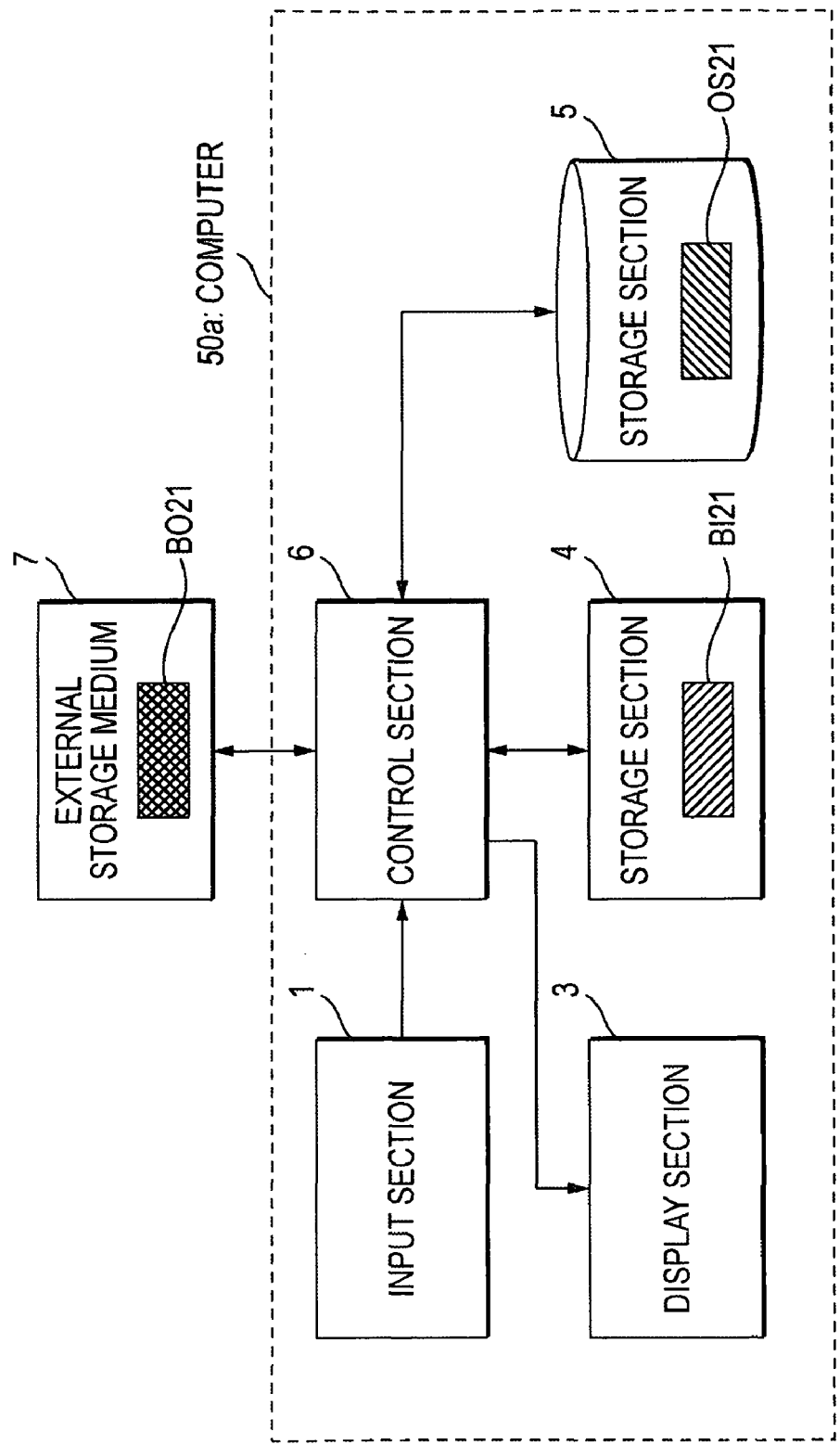
FIG. 1 is a block diagram showing an embodiment of an apparatus that uses the OS starting method according to the invention.

The invention will be described in detail referring to drawings. FIG. 1 is a block diagram showing an embodiment of an apparatus that uses the OS starting method according to the invention.

Figure 4:
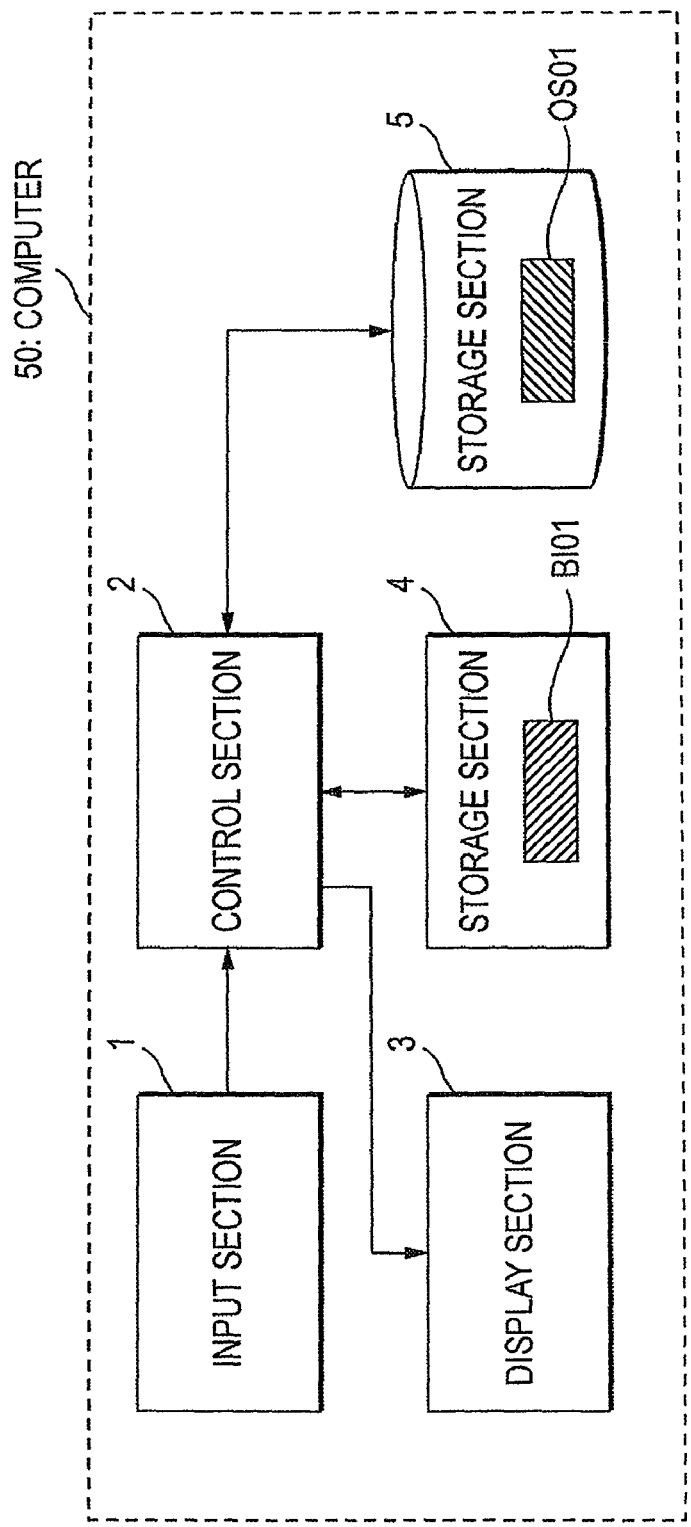
FIG. 4 is a block diagram showing an example of an apparatus that uses the related art OS starting method.
Figure 5:
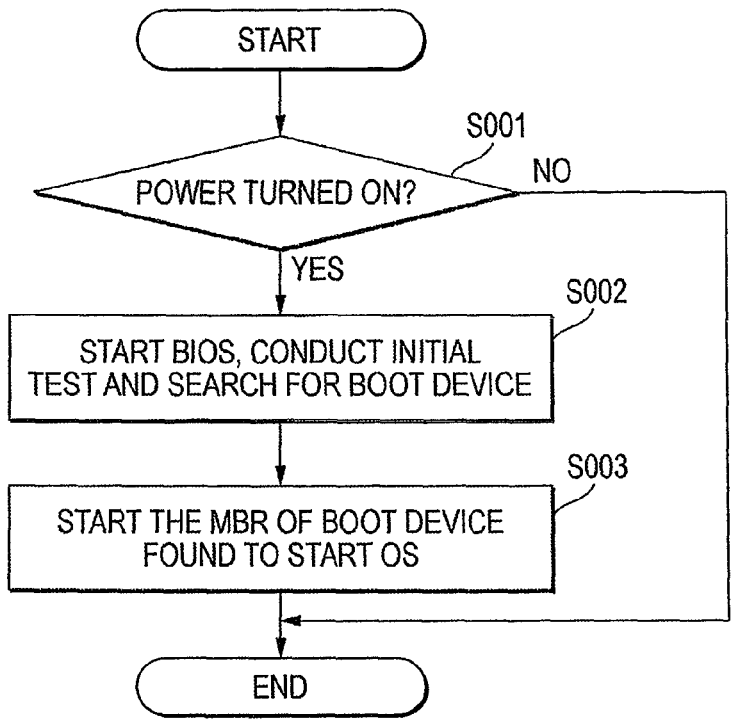
FIG. 5 is a flowchart explaining the operation of the control section.
Figure 6:
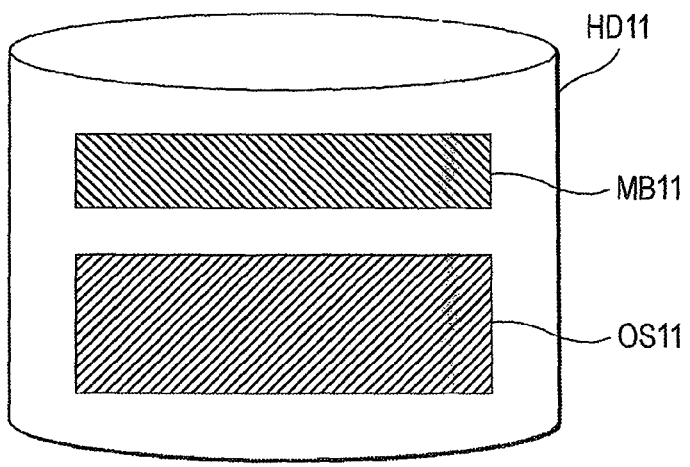
FIG. 6 is an explanatory drawing explaining the details of an OS stored in the storage section.

In FIG. 1, numerals 1, 3, 4 and 5 are the same as those in FIG. 4. Numeral 6 represents control section such as a CPU and an MPU. Numeral 7 is an external storage medium such as a memory and various types of memory cards. The numerals 1, 3, 4, 5, 6 and 7 constitute a computer 50a that is an information processing apparatus.

Output of the input section 1 is connected to the control section 6. A display signal from the control section 6 is connected to the display section 3. The storage section 4 and the storage section 5 are respectively interconnected with the control section 6. The control section 6 is interconnected with the external storage medium via an external interface.

Figure 2:
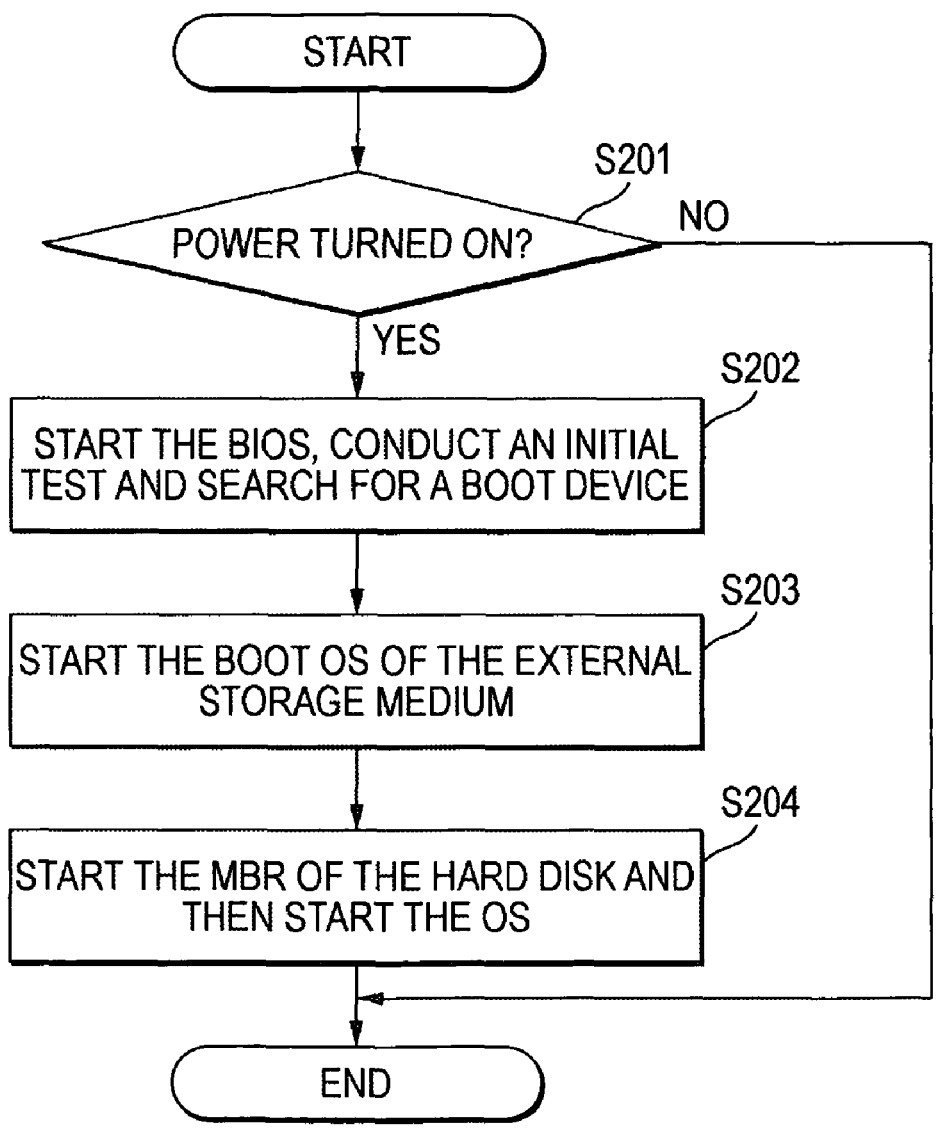
FIG. 2 is a flowchart explaining the operation of the control section.
Figure 3:
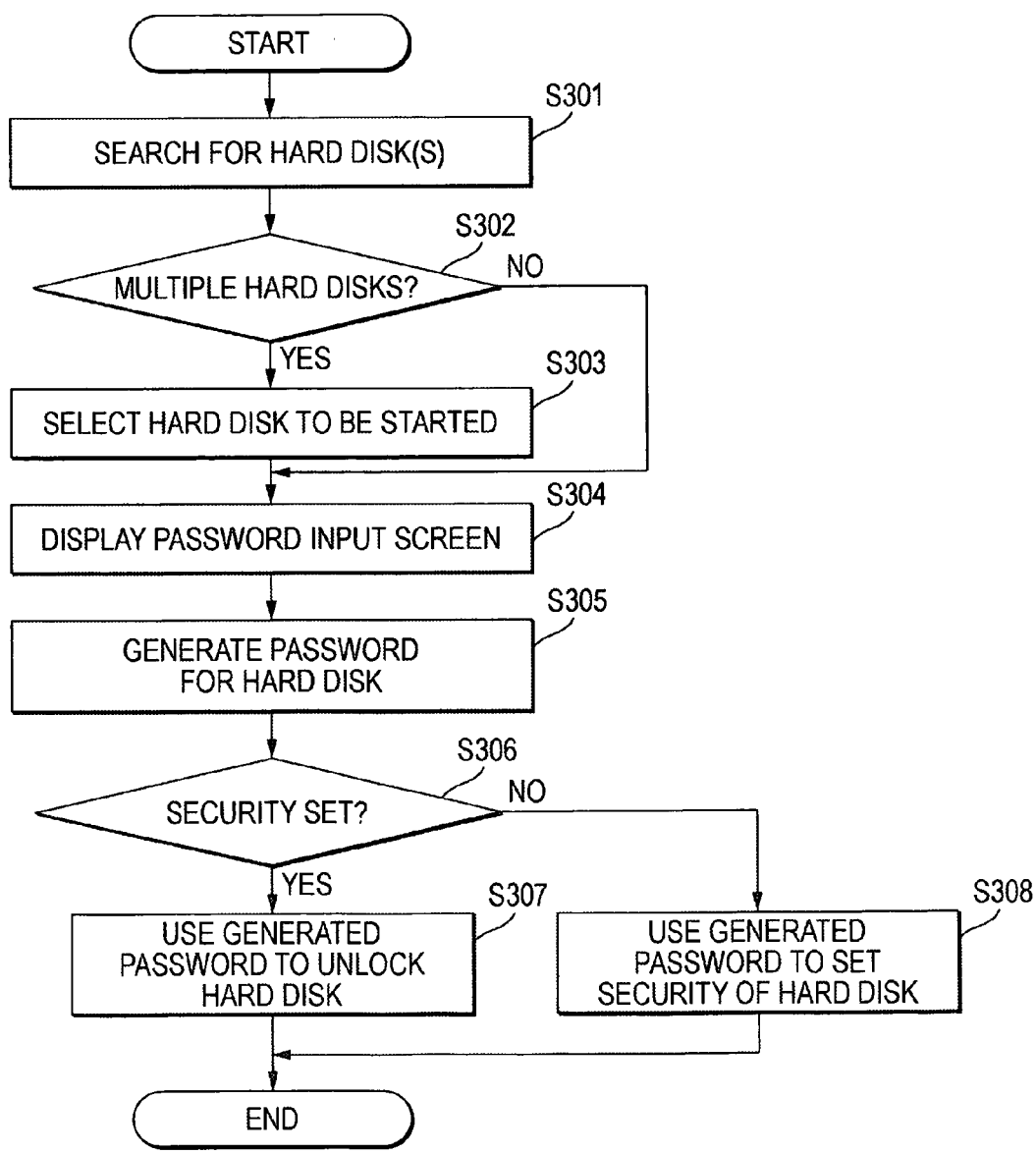
FIG. 3 is a flowchart explaining the operation of the control section.

Operation of the embodiment shown in FIG. 1 will be described using FIGS. 2 and 3. FIGS. 2 and 3 are flowcharts explaining the operation of the control section 6.

As an initial state, the BIOS is stored in the storage section 4 (flash memory) as shown by "BI21" in FIG. 1. The OS is stored in the storage section 5 (hard disk) as shown by "OS21" in FIG. 1.

As shown by "BO21" in FIG. 1, it is assumed that a program (hereinafter referred to as the boot OS) that is started between starting of BIOS and starting of OS in the external storage medium 7. It is assumed that the hard disk is set to the locked state by the ATA security command.

In "S201" in FIG. 2, the control section 6 determines whether power is turned on. When it has determined that power is turned on, the control section 6 starts, in "S202" in FIG. 2, the BIOS stored in the storage section 4, conducts an initial test at power-up, and searches for a boot device that can be started.

The hard disk is already set to the locked state by the ATA security command at this point. Thus the BIOS (to be more specific, the control section 6 executing the BIOS) cannot recognize the hard disk and searches for the boot OS stored in the external storage medium 7.

In "S203" in FIG. 2, the control section 6 starts the boot OS (to be more specific, loads the boot OS from the external storage medium 7 and executes the boot OS; hereinafter simply referred to as "starts the boot OS") stored in the external storage medium 7.

Operation of the boot OS (to be more specific, the control section 6 executing the boot OS) will be described in detail referring to FIG. 3. In "S301" in FIG. 3, the control section 6 searches the hard disk included in the computer 50a that is an information processing apparatus.

In "S302" in FIG. 3, the control section 6 determines whether multiple hard disks have been detected. If it is determined that multiple hard disks have been detected, the control section 6 selects a hard disk to be started in "S303" in FIG. 3.

When it is determined that multiple hard disks have not been detected in "S302" in FIG. 3, the control section 6 goes to "S304" in FIG. 3.

In "S304" in FIG. 3, the control section 6 engages the display section 3 to display a password input screen. In "S305" in FIG. 3, the control section 6 generates a password for the hard disk to be started (hereinafter referred to as the unlock password for simplicity) based on the password input from the input section 1 (hereinafter referred to as the input password for simplicity).

For example, to be more specific, the control section 6 concatenates information unique to the external storage medium 7 (hereinafter referred to as the unique code (string)) such as the serial number of a USB registered to the external storage medium 7 or the volume serial number of the FAT (File Allocation Tables) file system with the input password (string) to generate a hash value (data of a certain length obtained by applying a hash function to data of an arbitrary length; for example SHA256). The control section 6 uses the hash value as an unlock password.

In "S306" in FIG. 3, the control section 6 determines whether the hard disk to be started is provided with a security setting. When it is determined that the hard disk is provided with security setting, the control section 6 unlocks the locked state of the hard disk to be started by using the unlock password generated in "S307" in FIG. 3.

To be more specific, for example, the control section 6 uses the ATA security command "SECURITY UNLOCK" to unlock the locked state of the hard disk to be started.

In "S306" in FIG. 3, if it is determined that the hard disk is not provided with a security setting, the control section 6 sets the security of the hard disk in "S308" in FIG. 3.

To be more specific, for example, the control section 6 uses the ATA security command "SECURITY SET PASSWORD" to set the unlock password generated for the hard disk to be started as well as to set a master password. The master password is the unique code converted into a hash value.

With the security set by the ATA security command, when the hard disk power is turned off (including power off following normal shutdown and power off due to an abnormal end), the hard disk is automatically set to the unlock state by the specifications of the ATA security mode.

Once the security is set by the ATA security command, the hard disk is locked when the OS is started. Even when the computer that is an information processing apparatus is stolen or lost, the information (OS and other information) in the hard disk is reliably protected unless both an external storage medium that is security set and an unlock password are provided.

Finally, in "S204" in FIG. 2, the control section 6 starts the MBR at a first sector of the unlocked hard disk that is a boot device, starts the boot loader of the OS, and then starts the OS.

As a result, after the BIOS is started, the boot OS stored in the external storage medium is started, authentication is performed, the locked state of the hard disk to be started is unlocked, and then the OS is started. The hard disk is set to the locked state by the ATA security command so that protection of the information (OS and other information) stored in the hard disk is enabled.

The unlock password used to unlock the hard disk is generated by concatenating an input password with a unique code such as the serial number of a USB as unique information registered to the external storage medium 7. Therefore physical authentication by using an external storage medium is possible.

To be more specific, even when a boot OS is copied to another external storage medium and is connected to a computer 50a that is an information processing apparatus, unique codes differ between individual external storage media so that the OS cannot be started using the same input password. This enhances the protection of the information (OS and other information) stored in a hard disk.

While it is determined whether multiple hard disks or a single hard disk have been searched in the description of the embodiment shown in FIG. 1 (in particular operation in FIG. 3), this is not a mandatory condition.

While the BIOS conducts an initial test at a power up in the description of the embodiment shown in FIG. 1, but this is not a mandatory condition either.

While a unique code is concatenated with an input password to generate a hash value and the hash value is used as an unlock password, "SEED information" that is information generated based on a pre-registered user name may additionally be concatenated with the input password and with the unique code and the resulting string may be converted to a hash value in the description of the embodiment shown in FIG. 1. Similarly, for a master password, "SEED information" is concatenated with a unique code and the resulting string is converted to a hash value.

Under the situation where the hard disk is unlocked by the boot OS, the boot OS or a virus check feature stored in the external storage medium may be used to perform an offline virus check of the hard disk.

While the whole volumes of the hard disk is opened by way of the authentication by the boot OS in the description of the embodiment shown in FIG. 1, an available hard disk volume may be controlled per authenticated user.

In this case, it is possible to control an available volume per user and this allows finer control of a hard disk thus enhancing the protection of information (OS and other information) stored in the hard disk.

It is possible to vary the available area of the hard disk by volume, directory or file per authenticated user. In particular, only an area on which the user has authority is decoded and disclosed at startup of OS and the other areas are encrypted and concealed.

In this case, only an available area may be disclosed per user and the remaining areas are concealed and this allows finer control of a hard disk thus enhancing the protection of information (OS and other information) stored in the hard disk.

The invention provides the following advantages:

According to the first, second, third, fourth, fifth, sixth, seventh and eighth aspects of the invention, after the BIOS is started, the boot OS stored in the external storage medium is started to perform user authentication and unlock the locked state of the hard disk to be started, and then the OS is started. This makes it possible to authenticate when starting the OS without providing the BIOS with an authentication function. The hard disk is set to the locked state by the ATA security command so that protection of the information (OS and other information) stored in the hard disk is enabled.

The unlock password used to unlock the hard disk is generated by concatenating an input password with a unique code such as the serial number of a USB registered to the external storage medium 7. Therefore physical authentication by using an external storage medium is possible.

To be more specific, even when a boot OS is copied to another external storage medium and is connected to a computer 50a that is an information processing apparatus, unique codes differ between each individual external storage media so that the OS cannot be started even using the same input password. This enhances the protection of the information (OS and other information) stored in a hard disk.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An OS (Operating System) starting method of an OS that is stored in a hard disk of an information processing apparatus, the OS starting method comprising:
   starting a BIOS (Basic Input Output System) stored in a storage section when it is determined that a power is turned on;
   searching for a boot device that can be started;
   starting a boot OS being found and stored in an external storage medium;
   displaying a password input screen on a display section;
   generating an unlock password for the hard disk to be started by concatenating information unique to the external storage medium with an input password inputted by an input section and converting a concatenated result to a hash value;
   determining whether a setting of security of the hard disk to be started is performed;
   unlocking a locked state of the hard disk with the unlock password when it is determined that the setting of security of the hard disk to be started is performed;
   starting a MBR (Master Boot Record) of the hard disk whose locked state is unlocked;
   starting a boot loader of the OS;
   starting the OS; and
   performing the setting of security of the hard disk when it is determined that the setting of security of the hard disk is not performed.

2. The OS starting method according to claim 1, wherein the unlock password is generated by concatenating with the input password the information unique to the external storage medium and information generated based on a user name that is previously registered, and converting a concatenated result to the hash value.

3. The OS starting method according to claim 1, further comprising:
   controlling an available volume of the hard disk for each user being authenticated by the boot OS.

4. The OS starting method according to claim 1, further comprising:
   showing an available area of the hard disk in a volume unit, a directory unit or a file unit by decoding for each user being authenticated by the boot OS, and concealing other area of the hard disk by encryption.

5. The OS starting method according to claim 1, wherein the external storage medium is external to the information processing apparatus.

6. The OS starting method according to claim 1, wherein the BIOS is a BIOS without an authentication function, and the boot OS is a program that includes an authentication function.

7. An apparatus comprising:
   an input section;
   a display section;
   a storage section in which a BIOS (Basic Input Output System) is stored;
   a hard disk in which an OS (Operating System) is stored;
   an external storage medium in which a boot OS is stored; and
   a control section,
   wherein the control section starts the BIOS when it is determined that a power is turned on, searches for a boot device that can be started, starts the boot OS being found, displays a password input screen on the display section, generates an unlock password for the hard disk by concatenating an information unique to the external storage medium with an input password inputted by the input section and converting a concatenated result to a hash value, determines whether a setting of security of the hard disk is performed, unlocks a locked state of the hard disk with the unlock password when it is determined that the setting of security of the hard disk is performed, starts a MBR (Master Boot Record) of the hard disk whose locked state is unlocked, starts a boot loader of the OS; starts the OS, and performs the setting of security of the hard disk when it is determined that the setting of security of the hard disk is not performed.

8. The apparatus according to claim 7, wherein the control section generates the unlock password by concatenating with the input password the information unique to the external storage medium and information generated based on a user name that is previously registered, and converting a concatenated result to the hash value.

9. The apparatus according to claim 7, wherein the control section controls an available volume of the hard disk for each user being authenticated by the boot OS.

10. The apparatus according to claim 7, wherein the control section shows an available area of the hard disk in a volume unit, a directory unit or a file unit by decoding for each user being authenticated by the boot OS, and conceals other area of the hard disk by encryption.

11. The apparatus according to claim 7, wherein the external storage medium is external to the apparatus.

12. The apparatus according to claim 7, wherein the BIOS is a BIOS without an authentication function, and the boot OS is a program that includes an authentication function.

* * * * *